United States Patent
Monakova (10) Patent No.: US 11,934,175 B2
(45) Date of Patent: Mar. 19, 2024

(54) ROBOTIC PROCESS AUTOMATION FOR REMOTE ASSISTANCE

(71) Applicant: SAP SE, Walldorf (DE)

(72) Inventor: Ganna Monakova, Karlsruhe (DE)

(73) Assignee: SAP SE, Walldorf (DE)

( * ) Notice: Subject to any disclaimer, the term of this patent is extended or adjusted under 35 U.S.C. 154(b) by 683 days.

(21) Appl. No.: 17/061,999

(22) Filed: Oct. 2, 2020

(65) Prior Publication Data

US 2022/0107622 A1 Apr. 7, 2022

(51) Int. Cl.
*G05B 19/4155* (2006.01)
*G06F 9/451* (2018.01)

(52) U.S. Cl.
CPC ......... *G05B 19/4155* (2013.01); *G06F 9/451* (2018.02); *G05B 2219/31151* (2013.01); *G05B 2219/31156* (2013.01); *G05B 2219/50391* (2013.01)

(58) Field of Classification Search
CPC ...... G05B 19/4155; G05B 2219/31151; G05B 2219/31156; G05B 2219/50391; G06F 9/451
See application file for complete search history.

(56) References Cited

U.S. PATENT DOCUMENTS

| | | | |
|---|---|---|---|
| 2010/0185951 A1* | 7/2010 | Nichols | H04L 67/02 715/752 |
| 2011/0040824 A1* | 2/2011 | Harm | G06F 9/45529 726/4 |
| 2013/0139113 A1* | 5/2013 | Choudhary | G06F 3/0238 715/847 |
| 2014/0376919 A1* | 12/2014 | Nykoluk | G08C 23/04 398/107 |
| 2017/0220453 A1* | 8/2017 | Simons | G06F 3/04842 |

\* cited by examiner

*Primary Examiner* — Daniel Samwel
(74) *Attorney, Agent, or Firm* — Sterne, Kessler, Goldstein & Fox P.L.L.C.

(57) ABSTRACT

Disclosed herein are system, method, and computer program product embodiments for remotely executing a robotic process automation (RPA) bot as a function. An embodiment operates by generating an RPA bot function in a first network environment and transmitting the RPA bot function to an application located in a second network environment. The embodiment further operates by receiving results data from the application based on an execution of the RPA bot function in the second network environment. Subsequently, the embodiment operates by generating results user interface (UI) data based on the results data and transmitting the results UI data to a user input/output (I/O) device located in the first network environment.

20 Claims, 4 Drawing Sheets

ROBOTIC PROCESS AUTOMATION FOR REMOTE ASSISTANCE

BACKGROUND

Many employees have chosen or are required to work from home as a result of the recent restrictions related to the coronavirus disease 2019 (COVID-19). However, individual home internet connectivity speed varies widely and often can be much slower than in corporate environments with dedicated infrastructure. Additionally, employees often do not have the required software installed on their home machines and thus have to use a remote desktop for their work. As a result of these factors, simple daily tasks, like logging into a remote system and quickly navigating through a couple of application screens to collect information, has suddenly become long and frustrating, leading to decreased productivity. Remote workers, such as teleworkers and employees who are travelling, encounter similar problems based on their need to use slow hotel or public Wi-Fi with limited bandwidth.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing robotic process automation (RPA) remote assistant bots by remotely executing RPA bots as functions. RPA accelerates the digital transformation of computer-implemented processes by automatically replicating human user actions. RPA can be implemented as a complete automation suite where RPA software robots ("RPA bots") are configured to automate various user tasks and parts of computer-implemented processes through application user interfaces (UIs). For example, RPA bots can automate end-to-end scenarios for definable and repeatable computer-implemented processes, including mimicking human user actions by replacing manual clicks. RPA bots can also provide cross-technology, UI-based automation and thus can automate user tasks across different applications by simulating user actions in the UI. To do so, RPA bots can recognize and manipulate different applications through their UIs by, for example, identifying UI elements using criteria (e.g., element of type "Button" with identifier (id) "btnOK") and manipulating the identified UI elements through several actions (e.g., performing clicks, inputting textual data).

In one example, traditional RPA bots may be executed according to an unattended mode or an attended mode. The unattended mode executes a bot on a server and does not allow for any user communication. The unattended mode is normally triggered by a schedule or by an application programming interface (API) call and executed completely transparent for the end user. The execution status of such unattended bots is normally monitored by the bots' operators. The attended mode executes a bot on the user's machine and under the user's supervision. The user can select the bot they want to start, provide the required input, and the bot will start its execution directly on the user's machine. The bot may also stop in-between to collect additional data or to provide intermediate results. Usually, the attended bots, also called assistant bots, require all applications to be installed on the local machine. As RPA can also be used to automate virtual applications that are accessible remotely (e.g., via remote desktop connections), the applications could also be installed on a remote machine. But in order to be able to automate these applications, their screens will need to be transferred and rendered in the RDP client as described in the next example.

In another example, traditional remote desktop solutions use a substantial amount of data traffic to transmit full screen, hi-fidelity images to the local machine of the complete desktop session. Much of this data may not be needed locally, such as when the user just needs to perform actions in an application and is only interested in the final result of those actions. For instance, the user might need to navigate through several application screens to get to the information they need from an application in a UI or user experience (UX) system for software and applications. In this case, the user is not interested in the details of each application screen or any information outside of the application. Rather, the user only needs to access the target information. However, with existing technology, the user has no choice but to load each and every application screen so that they can click one button on it and navigate to the next application screen.

In contrast, the system, apparatus, device, method and/or computer program product embodiments, and/or combinations and sub-combinations thereof, described herein solve these technological problems by providing a new mode of RPA bot execution: remote assistant execution mode. RPA bot remote assistant execution mode allows a user to define an RPA bot as a function on their local machine, and that RPA bot executes remotely to control a remote application, eliminating the need for the user to have to interact with the remote application themselves. As such, the present disclosure provides: (i) the definition of a remote assistant pattern as a new mode of RPA; and (ii) an "on-the-fly RPA remote assistance bot specification generation technique" that allows users to quickly define their RPA actions without having access to the application they want to manipulate.

This problem is analogous to the situation where a function specification runs locally, while the data that function requires is retrieved from a remote source for every step of the function execution. This approach inhibits performance (e.g., decreases speed, increases computing power and memory usage, etc.) and generates unnecessary data traffic. Accordingly, there is a need to bring the function execution to where the data resides, thereby eliminating the need for the network in between. One illustrative and non-limiting example of the application of this concept is stored procedures, which execute functions directly on the database used to store and retrieve the required data. Applying this analogy to the RPA, the system, apparatus, device, method and/or computer program product embodiments, and/or combinations and sub-combinations thereof, described herein can treat the RPA bot as a function and create a framework to allow execution of this function close to the data that the RPA bot works on, such as applications and application screens.

In some embodiments, the system, apparatus, device, method and/or computer program product embodiments, and/or combinations and sub-combinations thereof, described herein can provide for using an RPA bot local agent configured to view the user actions on the application screens as a function that can be defined as an RPA bot. For example, the RPA bot local agent can be configured to capture user actions on application screens and generate an RPA bot as a function based on those user actions. This function can be configured to operate on application screen data associated with multiple application screens. The embodiments described herein provide a mechanism for generating RPA bot functions and transferring these functions to the target application for execution. Accordingly, the embodiments described herein provide a new form of RPA bot operation: RPA bot remote assistant execution mode.

In one illustrative example, the system, apparatus, device, method and/or computer program product embodiments, and/or combinations and sub-combinations thereof, described herein can provide for a first RPA agent (e.g., an RPA bot local agent) operating in a first network environment (e.g., a local network environment). In some embodiments, the first RPA agent can be configured to generate an RPA bot function, generate first UI data (e.g., input UI data) configured to generate a first UI for requesting particular user input based on the RPA bot function, and transmit the first UI data to one or more user input/output (I/O) devices operating in the first network environment. The first RPA agent can be further configured to receive input data from the one or more user I/O devices and transmit the RPA bot function and the input data to a second RPA agent (e.g., an RPA bot remote agent) operating in a second network environment (e.g., a remote network environment). In some embodiments, the first RPA agent can be configured to transmit the RPA bot function and the input data across a firewall disposed between the first network environment and the second network environment.

In some embodiments, the second RPA agent can be configured to receive the RPA bot function and the input data from the first RPA agent, generate RPA remote assistant bot execution data based on the RPA bot function and the input data, and transmit the RPA remote assistant bot execution data to an RPA function processor operating in the second network environment for execution. The RPA function processor can be configured to receive the RPA remote assistant bot execution data from the second RPA agent, execute the RPA remote assistant bot execution data, generate results data based on the execution of the RPA remote assistant bot execution data, and transmit the results data to the RPA bot local agent. In some embodiments, the second RPA agent can be configured to transmit the results data across a firewall disposed between the second network environment and the first network environment.

In some embodiments, the first RPA agent can be configured to receive the results data from the second RPA agent, generate second UI data (e.g., results UI data) configured to generate a second UI for displaying the results of the remote execution of the RPA bot function and the input data (e.g., the results data generated based on the execution of the RPA remote assistant bot execution data), and transmit the second UI data to the one or more user I/O devices.

There are many exemplary aspects to the system, apparatus, device, method and/or computer program product embodiments, and/or combinations and sub-combinations thereof, disclosed herein. For example, embodiments of the present disclosure provide for RPA remote assistant bots that can be used in remote desktop sessions by local devices with slower, bandwidth-limited internet connectivity speeds to execute functions in remote computing environments. In another example, embodiments of the present disclosure reduce the amount of data traffic required to execute an RPA bot in RPA bot remote assistant execution mode by substantially eliminating the transmission of full screen, hi-fidelity images to the local machine of the complete desktop session, the loading of each and every application screen, and the generation of unnecessary data traffic (e.g., data not needed locally). In yet other examples, embodiments of the present disclosure provide for: smaller impact on data traffic (e.g., by only passing the data that that is necessary); more efficient execution of the functions with direct system access; and automation of daily tasks. As a result of these and other embodiments described herein, the computing performance (e.g., speed, computing power, memory usage, etc.) of local and remote computing systems is significantly increased.

Figure 1:
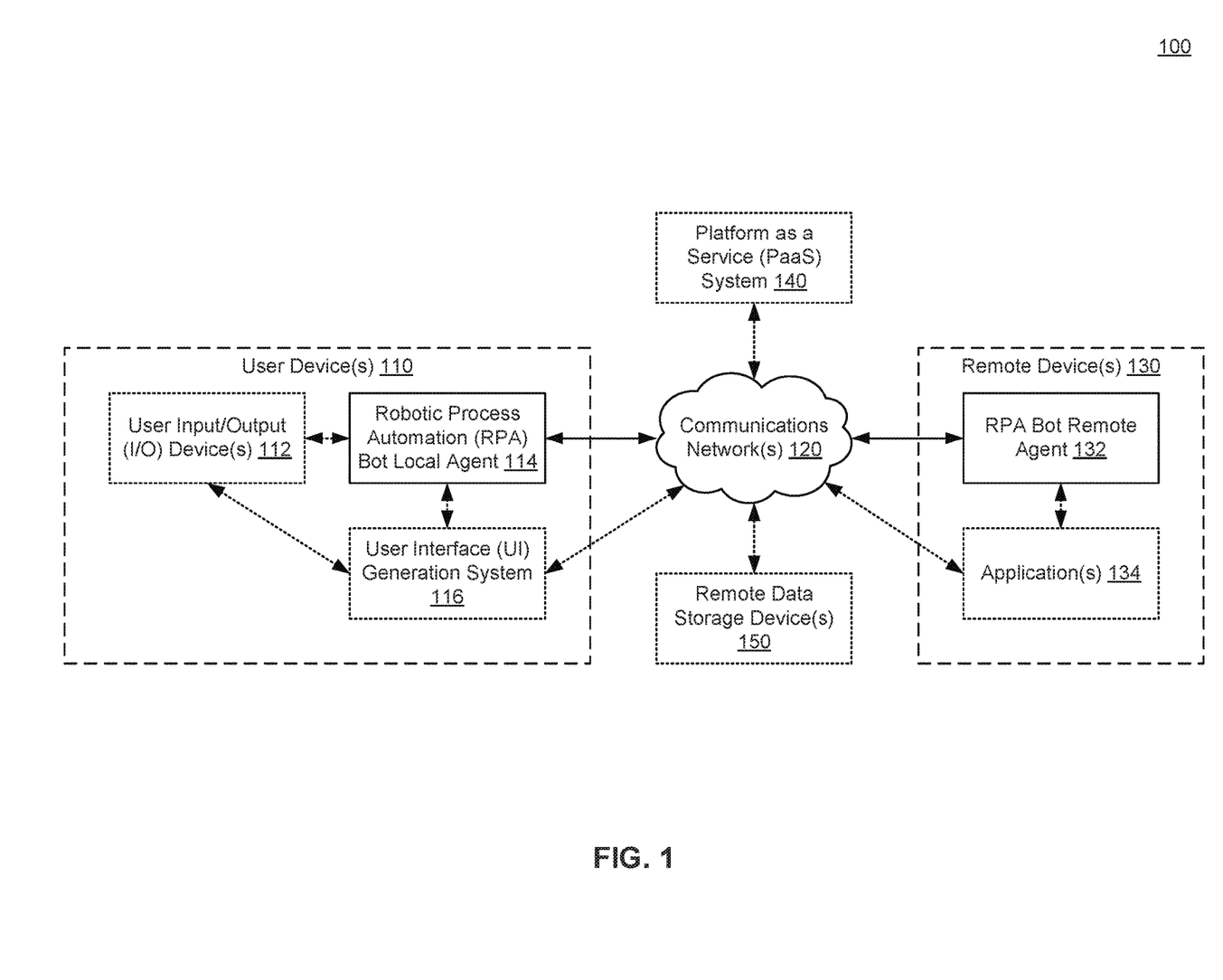
FIG. 1 is a block diagram of a robotic process automation (RPA) system, according to some embodiments.

FIG. 1 is a block diagram of an RPA system 100 having an RPA bot remote assistant execution mode, according to some embodiments. RPA system 100 can include one or more user devices 110, one or more remote devices 130, platform as a service (PaaS) system 140, and one or more remote data storage devices 150, communicatively coupled via communications network 120. In various embodiments, communications network 120 can include, without limitation, wired and/or wireless intranet, extranet, Internet, cellular, Wi-Fi, radio frequency (RF), infrared (IR), Bluetooth and/or any other near-field, short range, long range, local, regional, global communications network, as well as any combination thereof.

RPA system 100 can include a local network environment that includes one or more user devices 110. One or more user devices 110 can include one or more user I/O devices 112, an RPA bot local agent 114, a UI generation system 116 (e.g., configured to generate, provide, or otherwise implement the various UI data and UIs described herein), any other suitable hardware, processing circuitry, or software, or any combination thereof.

RPA system 100 can further include a remote network environment that includes one or more remote devices 130. One or more remote devices 130 can include an RPA bot remote agent 132, one or more applications 134, one or more RPA function processors, any other suitable hardware, processing circuitry, or software, or any combination thereof.

In some embodiments, the remote network environment may further include PaaS system 140, one or more remote data storage devices 150, one or more other external systems, or any combination thereof. As will be understood by a person of ordinary skill in the art, PaaS system 140 is not limited to a PaaS system and, in some embodiments, can additionally or alternatively include a backend as a service (BaaS) system, a mobile backend as a service (MBaaS) system, a content as a service (CaaS) system, a digital content as a service (DCaaS) system, a desktop as a service (DaaS) system, a framework as a service (FaaS) system, an infrastructure as a service (IaaS) system, a software as a service (SaaS) system, a managed software as a service (MSaaS) system, any other suitable cloud platform or "as a service" system, or any combination thereof.

In some embodiments, an example RPA system can contain three main components: (i) a design studio component configured to provide for project development and automation design; (ii) a factory component configured to manage and monitor automation executions (e.g., also referred to as bots); and (iii) an agent component configured to perform the actual execution. In a digital assistant mode, the agent component may be configured to run on one or more user devices. The agent component may observe user actions, receive user commands, and execute pre-defined bots directly on the one or more user devices.

In some embodiments, RPA system 100 can modify the architecture of the example RPA system described above to implement an RPA bot having an RPA bot remote assistant execution mode. For example, RPA system 100 can implement the RPA bot remote assistant execution mode by splitting the agent component of this example RPA system into at least two parts which are hosted on different machines: (i) RPA bot local agent 114 hosted locally on one or more user devices 110; (ii) RPA bot remote agent 132 hosted remotely (e.g., within a corporate network) on one or more remote devices 130; (iii) an agent-to-agent communication channel established between RPA bot local agent 114 and RPA bot remote agent 132; and (iv) a simplified "deployment" structure (e.g., architecture, technique) whereby the remote agent accepts the RPA bot package and immediately starts execution with the input parameters (e.g., single-step deployment of a package and triggering of an RPA bot). In one illustrative and non-limiting example, RPA bot local agent 114 and RPA bot remote agent 132 can be two separate installations of the same component, or substantially similar components, enhanced with an agent-to-agent communication protocol. In another illustrative and non-limiting example, RPA bot local agent 114 can be a different, simpler component than RPA bot remote agent 132 that is primarily responsible for UI display and data transmission to and from RPA bot remote agent 132.

In some embodiments, the communications between RPA bot local agent 114 and RPA bot remote agent 132 can be limited to the transmission of the relevant data. For example, the user can begin by (a) using one or more user I/O devices 112 to select a pre-modelled RPA bot, or (b) creating an RPA bot to work on their behalf by defining the actions they take within a given set of applications (e.g., as described herein with respect to the "on-the-fly RPA remote assistance bot specification generation technique"). RPA bot local agent 114 can start the execution by presenting to the user, via one or more user I/O devices 112, a form to collect input data for the RPA remote assistant bot. Once submitted, RPA bot local agent 114 can transmit the input data and the RPA bot function to RPA bot remote agent 132.

Next, RPA bot remote agent 132 can receive the user input and the RPA bot specification and execute one or more functions or actions defined by the RPA bot specification on one or more remote devices 130 (e.g., using one or more RPA function processors). For instance, RPA bot remote agent 132 can enter the provided input data in one or more applications 134 or retrieve data from a system, such as PaaS system 140 one or more remote data storage devices 150. Accordingly, RPA bot remote agent 132 is remotely performing the execution on behalf of the user, without the user needing to have one or more applications 134 installed or streamed to one or more user devices 110.

Subsequently, once execution completes, RPA bot remote agent 132 can return results data indicative of the final result of the execution back to one or more user devices 110 for presentation to the user via one or more user I/O devices 112. The results data can include, for example, a success message, any extracted data, any other suitable data, or any combination thereof. In some embodiments, this technique can result in very little data needing to be transferred between one or more user devices 110 and one or more remote devices 130 (e.g., the machine where the RPA bot is executed), making it suitable for situations where network connectivity is limited.

In some embodiments, RPA system 100 can utilize the RPA bot remote assistant execution mode disclosed herein to provide application access to mobile clients. In these embodiments, one or more user devices 110 can include a mobile device, and RPA bot local agent 114 can be an application running on the mobile device. RPA bot local agent 114 can have a substantially reduced footprint (e.g., computing power, memory usage, etc.) because it only needs to communicate with the user and RPA bot remote agent 132. The application may communicate with the user (e.g., display the available RPA bots, collect input, and provide results), while the actual execution may run on one or more remote devices 130 where RPA bot remote agent 132 is installed. RPA bot local agent 114 essentially can be an interface between the user and RPA bot remote agent 132.

In some embodiments, RPA system 100 can implement an "on-the-fly RPA remote assistance bot specification generation technique" that allows a user of one or more user devices 110 to quickly define RPA actions without having access to one or more applications 134 (e.g., the application they want to manipulate). This technique can make the RPA bot remote assistant execution mode more desirable in an ad-hoc scenario, when a user does not have to capture all of their tasks within RPA bot definitions beforehand. For example, the target users who would use RPA as an assistant may be non-technical users without the ability to comprehend, let alone create, complex RPA bot designs themselves. These RPA bot designs generally have to be able to capture complex user workflows, but in the case of the ad-hoc assistance, users may not need the complete power of the bot designer.

In some embodiments, ad-hoc RPA remote assistance bots can represent a portion (e.g., a small part) of the process, rather than the complete process. For example, an ad-hoc RPA remote assistance bot may operate according to the following pseudocode: "I need certain information from a system, but I do not have the access to it on my machine. Please go to the system, navigate through these screens, and perform these actions . . . ." In another example, "RPA bot as a function" may not replace company-critical functionality, but rather support users in their daily tasks. As such, ad-hoc RPA remote assistance bots can be executed only occasionally to complete user-specific tasks. In yet another example, the user may only need to define a small sequence of tasks and thus there may be little or no need for complex flow definition or exception management as is often necessary with many traditional bots.

In some embodiments, RPA system 100 can allow users to quickly and efficiently define such sequences, particularly when they do not have access to the systems that they want to perform actions on. For example, RPA system 100 can utilize the screens from the RPA store content for the ad-hoc bot design and introduce new action types that would allow extraction of the necessary bot input and output. This procedure would enable automatically generated user input and output UIs.

In some embodiments, product teams and application developers can deliver screens of their applications including identification of screen elements through an RPA store (e.g., one or more of one or more remote data storage devices 150) to make these screens, including the screenshots and element identifications, available to any RPA user. For example, for a product to be enabled for remote working using RPA system 100, the application may only need to publish their product screens as a screens package in the RPA store. A user can then use these screens quickly to define a sequence of steps they currently need and specify the information they want to get back without needing to access the actual system.

In some embodiments, RPA system 100 can implement the "on-the-fly RPA remote assistance bot specification generation technique" according to the following operations. First, the user can use one or more user I/O devices 112 to drag and drop the screens they want to navigate through from the available RPA store content. Second, the user can use one or more user I/O devices 112 to specify the actions they want to perform on each screen (e.g., click button, set input, get data, etc.). Third, RPA system 100 can use special "INPUT" markers on the elements where the user wants to pass the input. For example, based on these markers, RPA bot local agent 114 can automatically (e.g., without user input) generate and display an input UI to collect user data before the RPA remote assistant bot execution. Fourth, RPA system 100 can use special "OUTPUT" markers on the data that the user wants to retrieve from one or more applications 134. For example, based on these markers, RPA bot local agent 114 can automatically generate and display an output UI (e.g., a results UT) once the execution has completed.

In some embodiments, the RPA remote assistant bots designed in this manner can then be used either on their own, or to enhance the value of the "RPA bot as a function" techniques described herein. In some embodiments, in the RPA bot remote assistant execution mode, RPA bot remote agent 132 may also return the screen reference of its current position. The user can use this reference as the start screen to define the next sequence of actions that need to be executed. The user essentially would be performing remote steering of the application according to the following pseudocode: the user can instruct the RPA remote assistant bot, "Do this, this, and this"; and the RPA remote assistant bot can reply, "Done, here is the data that you have asked for, and this is my current position in the system. What do you want me to do next?"; and so forth.

Figure 2:
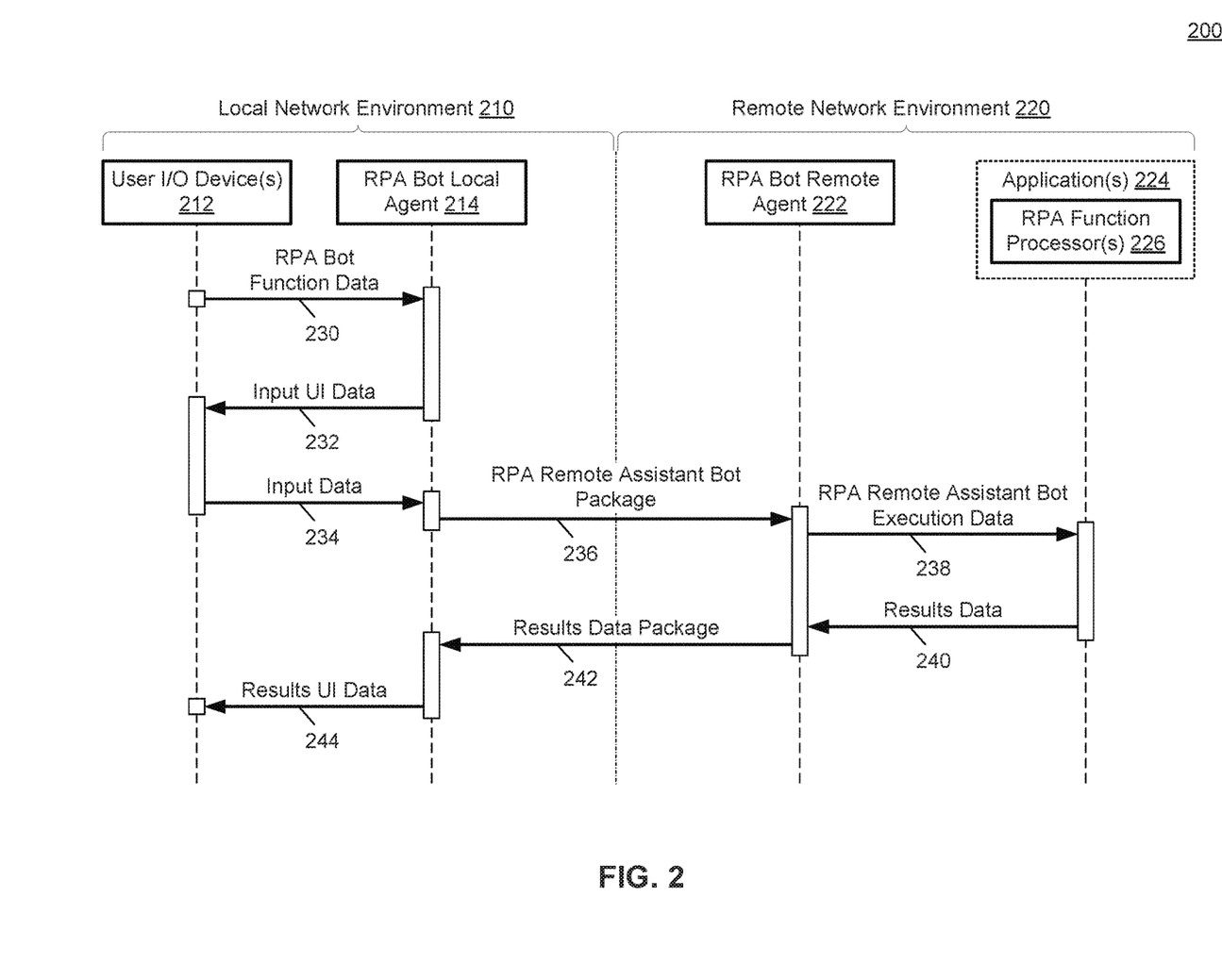
FIG. 2 is a block diagram of another RPA system, according to some embodiments.

FIG. 2 is a block diagram of an RPA system 200 having an RPA bot remote assistant execution mode, according to some embodiments. RPA system 200 can include one or more user I/O devices 212 and an RPA bot local agent 214 located in a local network environment 210. RPA system 200 can further include an RPA bot remote agent 222, one or more applications 224, and one or more RPA function processors 226 located in a remote network environment 220. In some embodiments, RPA bot local agent 214 may be configured to communicate with RPA bot remote agent 222 through a firewall between local network environment 210 and remote network environment 220. In some embodiments, RPA system 200 can further include an agent-to-agent communication channel established between RPA bot local agent 214 and RPA bot remote agent 222. In some embodiments, RPA system 200 can further include a "deployment" structure (e.g., architecture, technique) whereby the RPA bot remote agent 222 can receive an RPA bot package and begin execution with the input parameters.

In some embodiments, RPA bot local agent 214 can be configured to receive RPA bot function data 230 from one or more user I/O devices 212. In one example, RPA bot local agent 214 can be configured to receive RPA bot function data 230 by capturing a set of user actions performed on a set of live applications or application screenshots using one or more user I/O devices 212. For instance, RPA bot local agent 214 can begin by generating an RPA remote assistant bot to work on their behalf by defining the actions they take within a given set of one or more applications 224 (e.g., by generating an "on-the-fly RPA remote assistance bot specification"). In another example, RPA bot local agent 214 can be configured to receive RPA bot function data 230 by receiving a user selection of an RPA remote assistant bot (e.g., input by a user using one or more user I/O devices 212). For instance, the user can begin by selecting a pre-modeled RPA remote assistant bot to work on their behalf.

In some embodiments, the set of live applications or application screenshots may not include "live" screens, but rather may include screenshots with annotations provided over the content store. In other embodiments, the set of live applications or application screenshots may include one or more "live" screens, such as when RPA system 200 has local access to a test system, but would like to execute some actions on another (e.g., productive) system that is only available in the remote environment. In these embodiments, RPA system 200 may show the actions to do on the local system using "live" system screens and instruct the RPA remote assistant bot to execute the same actions on the remote system.

In some embodiments, RPA bot local agent 214 can be configured to generate an RPA bot function based on RPA bot function data 230. In one example, RPA bot local agent 214 can be configured to generate the RPA bot function based on a captured set of user actions. In another example, RPA bot local agent 214 can be configured to generate the RPA bot function based on a user selection (e.g., input by a user using one or more user I/O devices) of an RPA remote assistant bot. In some embodiments, the RPA bot function can correspond to an RPA bot remote assistant execution mode of an RPA bot.

In some embodiments, RPA bot local agent 214 can be configured to generate input UI data 232 based on, or associated with, the RPA bot function or one or more RPA bot function parameters. Input UI data 232 can include, for example, data and other electronic information for use in generating (e.g., by one or more user I/O devices 212) an input UI configured to collect input data 234 (e.g., RPA remote assistant bot input data, function input parameters) for the RPA remote assistant bot based on the RPA bot function. In some embodiments, RPA bot local agent 214 can be configured to transmit input UI data 232 to one or more user I/O devices 212. In one illustrative and non-limiting example, RPA bot local agent 214 can be configured to begin executing the RPA remote assistant bot by presenting to the user, via one or more user I/O devices 212, an electronic form to collect input data 234.

In some embodiments, one or more user I/O devices 212 can be configured to receive input UI data 232 from RPA bot local agent 214. In some embodiments, one or more user I/O devices 212 can be configured to generate an input UI based on input UI data 232, display the input UI on a display device included in, or communicatively coupled to, one or more user I/O devices 212, and receive input data 234 provided by a user using one or more user I/O devices 212 in response to the input UI. Input data 234 can include, for example, input data for the RPA remote assistant bot or function. In some embodiments, one or more user I/O devices 212 can be configured to transmit input data 234 to RPA bot local agent 214.

In some embodiments, RPA bot local agent 214 can be configured to receive input data 234 from one or more user I/O devices 212. In other embodiments, if it is desired to use a certain function or bot only once, input data 234 can be hardcoded into the bot or function specification. In some embodiments, RPA bot local agent 214 can be configured to generate an RPA remote assistant bot package 236 including input data 234 and the RPA bot function. In some embodiments, RPA bot local agent 214 can be configured to transmit RPA remote assistant bot package 236 to RPA bot remote agent 222.

In some embodiments, RPA bot remote agent 222 can be configured to receive RPA remote assistant bot package 236 from RPA bot local agent 214. In some embodiments, RPA bot remote agent 222 can be configured to generate RPA remote assistant bot execution data 238 based on RPA remote assistant bot package 236. In some embodiments, RPA remote assistant bot execution data 238 may be an unpackaged or repackaged version of RPA remote assistant bot package 236. In some embodiments, RPA bot remote agent 222 can be configured to transmit RPA remote assistant bot execution data 238 to one or more applications 224 for execution by one or more RPA function processors 226.

In some embodiments, one or more RPA function processors 226 can be configured to receive RPA remote assistant bot execution data 238 from RPA bot remote agent 222 (e.g., directly, or via one or more applications 224). In some embodiments, one or more RPA function processors 226 can be configured to execute RPA remote assistant bot execution data 238 and generate results data 240 based on the execution of RPA remote assistant bot execution data 238. In some embodiments, one or more RPA function processors 226 can be configured to transmit results data 240 to RPA bot remote agent 222 (e.g., directly, or via one or more applications 224). In some embodiments, RPA bot remote agent 222 can be configured to generate a results data package 242 including results data 240. In some embodiments, RPA bot remote agent 222 can be configured to transmit results data package 242 to RPA bot local agent 214.

In some embodiments, RPA bot local agent 214 can be configured to receive results data package 242 from RPA bot remote agent 222. In some embodiments, RPA bot local agent 214 can be configured to generate results UI data 244 based on results data package 242. In some embodiments, results UI data 244 can be configured to generate (e.g., by one or more user I/O devices 212) a results UI for displaying the results of the remote execution of the RPA bot function and input data 234 (e.g., results data 240 generated based on the execution of RPA remote assistant bot execution data 238 by one or more RPA function processors 226). In some embodiments, RPA bot local agent 214 can be configured to transmit results UI data 244 to one or more user I/O devices 212.

Figure 3:
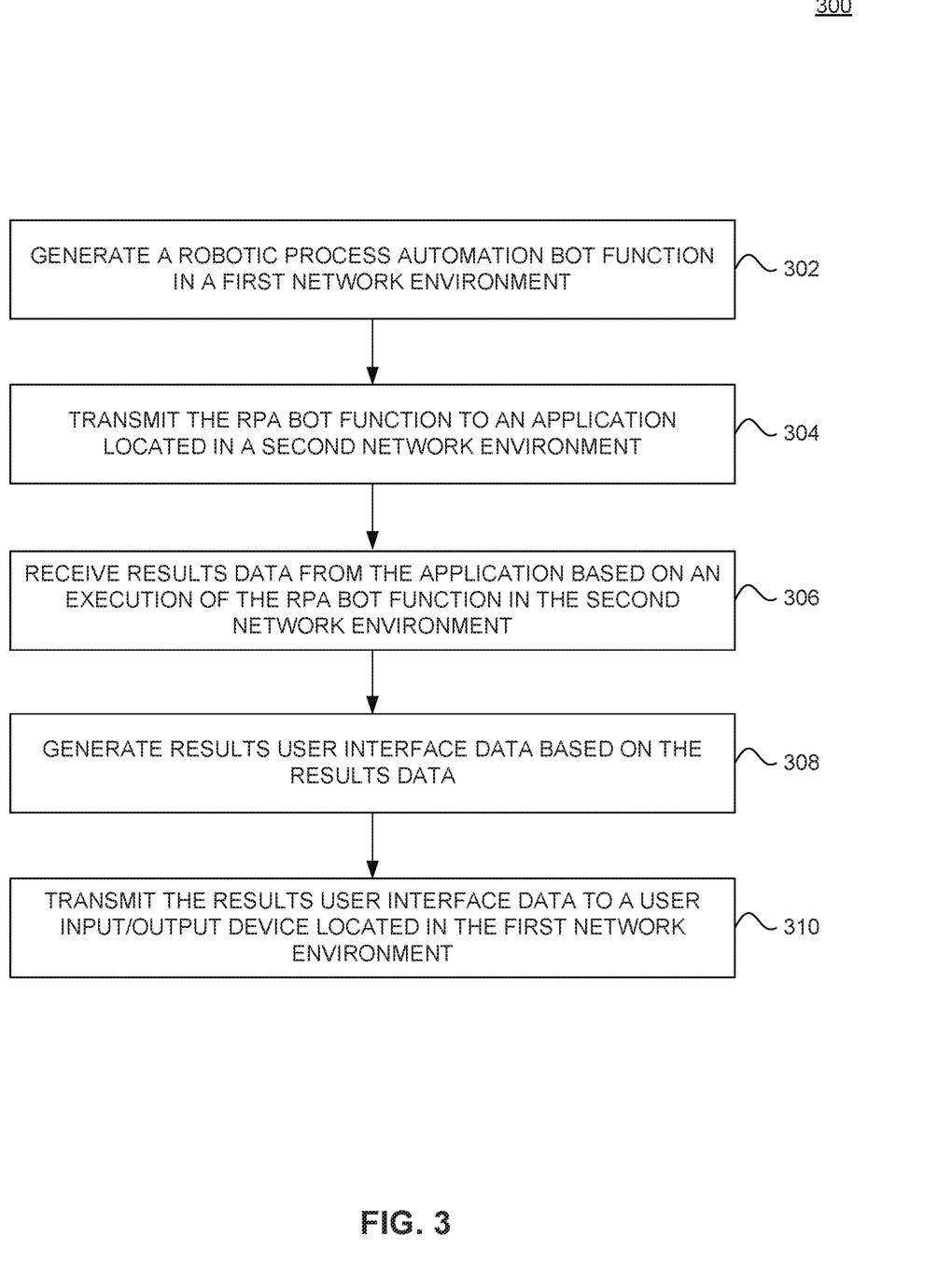
FIG. 3 is a flowchart illustrating a process for remotely executing an RPA bot function, according to some embodiments.

FIG. 3 is a flowchart for a method 300 for remotely executing an RPA bot function. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, RPA system 100 generates (e.g., using RPA bot local agent 114) an RPA bot function in a first network environment (e.g., local network environment 210). The RPA bot function can be, for example, a definition of an RPA bot that RPA system 100 can bring can to the data (e.g., "bring function to data"). In one example, RPA system 100 can generate the RPA bot function by capturing a set of user actions performed on a set of live applications or application screenshots using one or more user I/O devices 112 and generating the RPA bot function based on the captured set of user actions. The "function" can be the application screens, and the "data" can be the RPA bot. Alternatively, the RPA bot can be the "function" and the application screens can be the "data." The RPA remote assistant mode can be configured to bring the function to the data (e.g., bring the function execution to where the data resides), such as by executing the RPA bot (e.g., the "function") in the same network and on the same machines where the applications (e.g., the "data") reside. Optionally, RPA system 100 can generate (or cause the generation of) an input UI to receive RPA bot function parameters, RPA bot input data, or both.

In 304, RPA system 100 transmits the RPA bot function to an application located in a second network environment (e.g., remote network environment 220). For example, RPA system 100 can transmit the RPA bot function to one or more applications 134 (e.g., for execution by one or more RPA function processors 226) via RPA bot remote agent 132.

Optionally, RPA system 100 can generate input UI data based on the RPA bot function or one or more RPA bot function parameters; and transmit the input UI data to one or more user I/O devices 112. Optionally, RPA system 100 can receive input data generated by a user using one or more user I/O devices 112 in response to an electronic presentation of an input UI generated by one or more user I/O devices 112 based on the input UI data. Optionally, RPA system 100 can transmit the RPA bot function together with the input data to the application located in the second network environment.

In 306, RPA system 100 receives results data from the application based on an execution of the RPA bot function in the second network environment. For example, RPA system 100 can receive the results data from one or more applications 134 (e.g., after execution of the RPA bot function by one or more RPA function processors 226) via RPA bot remote agent 132.

In 308, RPA system 100 generates results UI data based on the results data. In 310, RPA system 100 transmits the results UI data to one or more user I/O devices 112 located in the first network environment.

Figure 4:
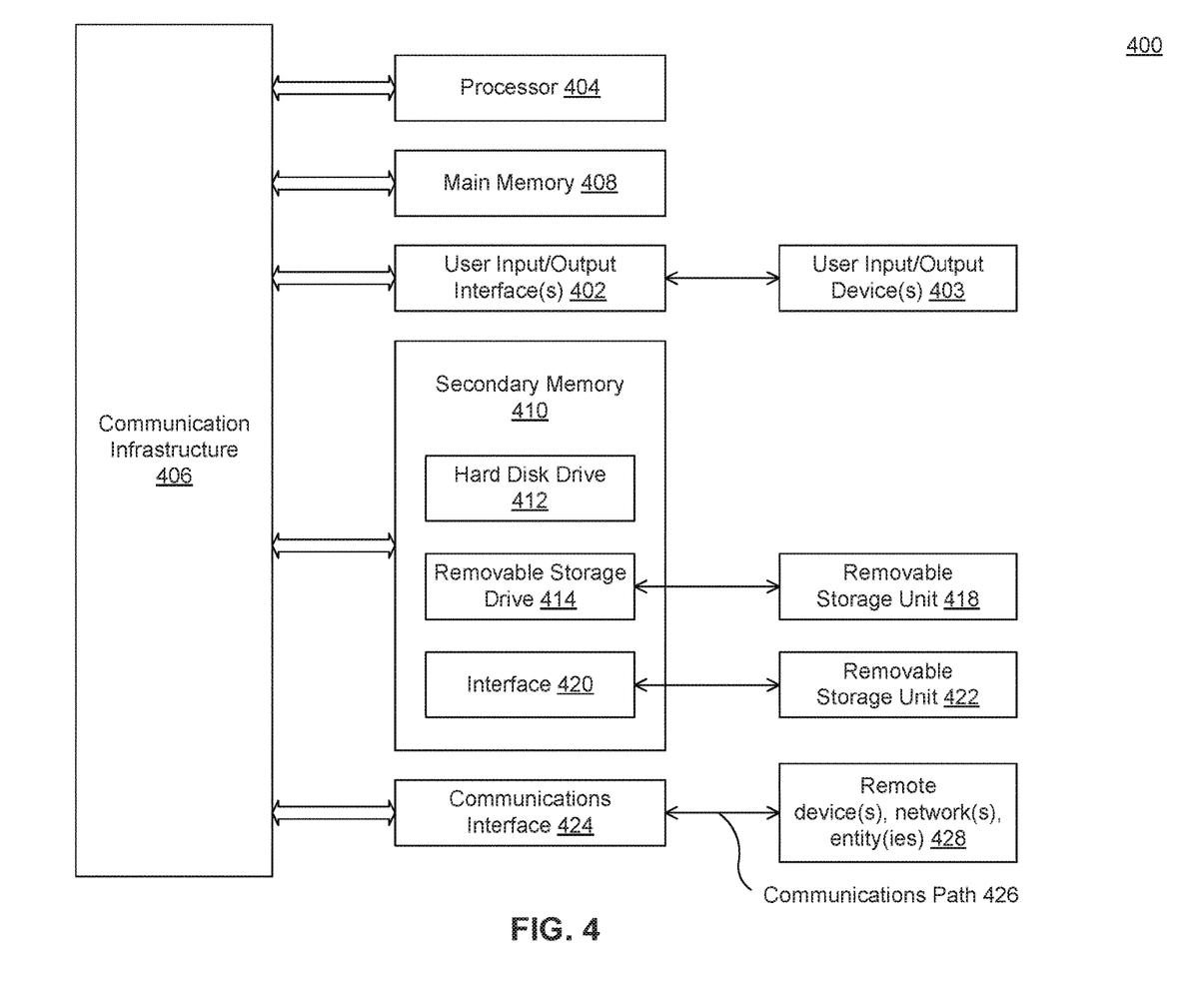
FIG. 4 is an example computer system useful for implementing various embodiments.

Various embodiments may be implemented, for example, using one or more well-known computer systems, such as computer system 400 shown in FIG. 4. Computer system 400 may be used, for example, to implement any of the embodiments discussed herein, as well as combinations and sub-combinations thereof.

Computer system 400 may include one or more processors (also called central processing units, or CPUs), such as one or more processors 404. One or more processors 404 may be connected to a communications infrastructure 406 (e.g., a bus).

Computer system 400 may also include user input/output device(s) 403, such as monitors, keyboards, pointing devices, etc., which may communicate with communications infrastructure 406 through user input/output interface(s) 402.

One or more of one or more processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main memory 408 (e.g., a primary memory), such as random access memory (RAM). Main memory 408 may include one or more levels of cache. Main memory 408 may have stored therein control logic (i.e., computer software) and/or data.

Computer system 400 may also include secondary memory 410 (e.g., one or more storage devices). Secondary memory 410 may include, for example, a hard disk drive 412 and/or a removable storage drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication interface 424 (e.g., a network interface). Communication interface 424 may enable computer system 400 to communicate and interact with any combination of external devices, external networks, external entities, etc. (individually and collectively referenced by reference number 428). For example, communication interface 424 may allow computer system 400 to communicate with remote device(s), network(s), entity(ies) 428 over communications path 426, which may be wired and/or wireless (or a combination thereof), and which may include any combination of LANs, WANs, the Internet, etc. Control logic and/or data may be transmitted to and from computer system 400 via communications path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions): "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, removable storage unit 418, and removable storage unit 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method for remotely executing a robotic process automation bot as a function, comprising:
   receiving, at a first device, one or more screenshots for an application, wherein the application is not installed on the first device;
   generating, on the first device connected to a first network environment, a robotic process automation bot function for the application based on the one or more screenshots, wherein the robotic process automation bot function comprises one or more actions to be performed on the application;
   transmitting, by the first device, the robotic process automation bot function to the application executable from a second device connected to a second network environment;
   receiving, by the at least one processor, results data from the application based on an execution of the robotic process automation bot function in the second network environment;
   generating, by the at least one processor, results user interface data based on the results data; and
   transmitting, by the at least one processor, the results user interface data to a user input/output device located in the first network environment.

2. The method of claim 1, wherein the generating the robotic process automation bot function comprises:
   capturing, by the at least one processor, a set of user actions performed on a set of live applications or application screenshots using the user input/output device; and
   generating, by the at least one processor, the robotic process automation bot function based on the set of user actions.

3. The method of claim 2, wherein the generating the robotic process automation bot function comprises:
   generating, by the at least one processor, the robotic process automation bot function according to an on-the-fly robotic process automation remote assistance hot specification generation technique.

4. The method of claim 1, further comprising:
   generating, by at least one processor, input user interface data based on the robotic process automation bot function or one or more robotic process automation hot function parameters; and
   transmitting, by the at least one processor, the input user interface data to the user input/output device.

5. The method of claim 4, further comprising:
   receiving, by the at least one processor, input data generated by a user using the user input/output device in response to an electronic presentation of an input user interface generated by the user input/output device based on the input user interface data; and
   transmitting, by the at least one processor, the robotic process automation bot function and the input data to the application located in the second network environment.

6. The method of claim 1, wherein:
   the first network environment is a local network environment; and
   the second network environment is a remote network environment.

7. The method of claim 1, wherein the robotic process automation bot function corresponds to a robotic process automation hot remote assistant execution mode.

8. The method of claim 1, wherein the receiving one or more screenshots comprises:
   generating, by the first device, an input marker, on an element of a first screenshot of the one or more screenshots, wherein the input marker causes the robotic process automation to display an input user interface to collect data associated with the element.

9. A system, comprising:
   a memory; and
   at least one processor coupled to the memory and configured to:
      receive, at a first device, one or more screenshots for an application, wherein the application is not installed on the first device;
      generate, on the first device connected to a first network environment, a robotic process automation bot function for the application based on the one or more screenshots, wherein the robotic process automation bot function comprises one or more actions to be performed on the application;
      transmit, by the first device, the robotic process automation bot function to the application executable from a second device connected to a second network environment;
      receive results data from the application based on an execution of the robotic process automation bot function in the second network environment;
      generate results user interface data based on the results data; and
      transmit the results user interface data to a user input/output device located in the first network environment.

10. The system of claim 9, wherein to generate the robotic process automation bot function, the at least one processor is configured to:
    capture a set of user actions performed on a set of live applications or application screenshots using the user input/output device; and
    generate the robotic process automation bot function based on the set of user actions.

11. The system of claim 10, wherein to generate the robotic process automation bot function, the at least one processor is configured to:
    generate the robotic process automation bot function according to an on-the-fly robotic process automation remote assistance bot specification generation technique.

12. The system of claim 9, the at least one processor further configured to:
- generate input user interface data based on the robotic process automation bot function or one or more robotic process automation bot function parameters; and
- transmit the input user interface data to the user input/output device.

13. The system of claim 12, the at least one processor further configured to:
- receive input data generated by a user using the user input/output device in response to an electronic presentation of an input user interface generated by the user input/output device based on the input user interface data; and
- transmit the robotic process automation but function and the input data to the application located in the second network environment.

14. The system of claim 9, wherein:
- the first network environment is a local network environment; and
- the second network environment is a remote network environment.

15. A non-transitory computer-readable medium having instructions stored thereon that, when executed by at least one computing device, cause the at least one computing device to perform operations comprising:
- receiving, at a first device, one or more screenshots for an application, wherein the application is not installed on the first device;
- generating, on the first device connected to a first network environment, a robotic process automation bot function for the application based on the one or more screenshots, wherein the robotic process automation bot function comprises one or more actions to be performed on the application;
- transmitting, by the first device, the robotic process automation bot function to the application executable from a second device connected to a second network environment;
- receiving results data from the application based on an execution of the robotic process automation bot function in the second network environment;
- generating results user interface data based on the results data; and
- transmitting the results user interface data to a user input/output device located in the first network environment.

16. The non-transitory computer-readable medium of claim 15, wherein the generating the robotic process automation bot function comprises:
- capturing a set of user actions performed on a set of live applications or application screenshots using the user input/output device; and
- generating the robotic process automation bot function based on the set of user actions.

17. The non-transitory computer-readable medium of claim 16, wherein the generating the robotic process automation bot function comprises:
- generating the robotic process automation bot function according to an on-the-fly robotic process automation remote assistance bot specification generation technique.

18. The non-transitory computer-readable medium of claim 15, the operations further comprising:
- generating input user interface data based on the robotic process automation bot function or one or more robotic process automation bot function parameters; and
- transmitting the input user interface data to the user input/output device.

19. The non-transitory computer-readable medium of claim 18, the operations further comprising:
- receiving input data generated by a user using the user input/output device in response to an electronic presentation of an input user interface generated by the user input/output device based on the input user interface data; and
- transmitting the robotic process automation bot function and the input data to the application located in the second network environment.

20. The non-transitory computer-readable medium of claim 15, wherein:
- the first network environment is a local network environment;
- the second network environment is a remote network environment; and
- the robotic process automation hot function corresponds to a robotic process automation bot remote assistant execution mode.

* * * * *